US012692883B2

(12) United States Patent
Shiramatsu

(10) Patent No.: US 12,692,883 B2
(45) Date of Patent: Jul. 28, 2026

(54) JOINT STRUCTURE

(71) Applicant: FANUC CORPORATION, Yamanashi (JP)

(72) Inventor: Daisuke Shiramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 314 days.

(21) Appl. No.: 18/252,353

(22) PCT Filed: Feb. 14, 2022

(86) PCT No.: PCT/JP2022/005754
§ 371 (c)(1),
(2) Date: May 9, 2023

(87) PCT Pub. No.: WO2022/176817
PCT Pub. Date: Aug. 25, 2022

(65) Prior Publication Data
US 2023/0313822 A1 Oct. 5, 2023

(30) Foreign Application Priority Data

Feb. 19, 2021 (JP) ................................. 2021-025391

(51) Int. Cl.
*F16B 5/02* (2006.01)
*B25J 9/00* (2006.01)
(Continued)

(52) U.S. Cl.
CPC .............. *F16B 5/02* (2013.01); *B25J 9/0009* (2013.01); *B25J 19/0075* (2013.01); *F16B 5/07* (2013.01);
(Continued)

(58) Field of Classification Search
CPC .............. F16B 2200/99; B25J 19/0075; Y10T 403/1616; Y10T 403/1624
See application file for complete search history.

(56) References Cited

U.S. PATENT DOCUMENTS

| | | | |
|---|---|---|---|
| 4,731,973 A | 3/1988 | Stenemann | |
| 5,848,852 A | 12/1998 | Shpigel | |
| (Continued) | | | |

FOREIGN PATENT DOCUMENTS

| | | | |
|---|---|---|---|
| CN | 109707709 A | 5/2019 | |
| JP | H05-310164 A | 11/1993 | |
| (Continued) | | | |

OTHER PUBLICATIONS

International Search Report issued in PCT/JP2022/005754; mailed Apr. 12, 2022.

*Primary Examiner* — Michael P Ferguson
(74) *Attorney, Agent, or Firm* — Studebaker Brackett PLLC

(57) ABSTRACT

This invention provides a joint structure in which three-dimensionally intersecting joint surfaces of two members can be brought into close contact with each other. The joint structure comprises: a casing 2 having a first main joint surface 24, and a first sub-joint surface 25 that three-dimensionally intersects the first main joint surface 24; a cover 3 having a second main joint surface 34 facing the first main joint surface 24 and a second sub-joint surface 35 facing the first sub-joint surface 25; a guide portion 4 that gradually reduces the facing distance between the first sub-joint surface 25 and the second sub-joint surface 35 as the facing distance between the first main joint surface 24 and the second main joint surface 34 is reduced, and when the second main joint surface 34 is joined to the first main joint surface 24, allows the second sub-joining surface 35 to be joined to the first sub-joining surface 25, and positions the (Continued)

cover 3 with respect to the casing 2; and a screw 5 that fastens the joined first main joint surface 24 and second main joint surface 34 to each other.

4 Claims, 12 Drawing Sheets

(51) Int. Cl.
  *B25J 19/00*        (2006.01)
  *F16B 5/07*         (2006.01)
(52) U.S. Cl.
  CPC ..... *F16B 2200/99* (2023.08); *Y10T 403/1624* (2015.01)

(56)                    References Cited

U.S. PATENT DOCUMENTS 10,625,414 B2 *  4/2020  Haddadin  .............. B25J 9/0009
  11,248,738 B2 *  2/2022  Wakasugi  ............. B25J 9/1065

2013/0255428 A1 *  10/2013  Hahakura  .............. B25J 9/0009
                                                         901/23
  2015/0078805 A1 *  3/2015  Morris  ................... B62D 27/06
                                                         403/13
  2015/0093179 A1 *  4/2015  Morris  ................... B62D 27/02
                                                         403/13
  2019/0168126 A1 *  6/2019  Xiong  .................... A63H 11/00

FOREIGN PATENT DOCUMENTS

JP        2014-198347  A     10/2014
  JP        2014-201117  A     10/2014
  JP        2016-198849  A     12/2016
  JP        2017-087392  A      5/2017
  KR          101675341  B1    11/2016
  TW           M342336   U     10/2008
  WO        2013/027367  A1     2/2013

* cited by examiner

JOINT STRUCTURE

TECHNICAL FIELD

The present invention relates to a joint structure for joining two members to each other.

BACKGROUND ART

A structure has been known in which a member having two three-dimensionally intersecting surfaces is fixed to another member having surfaces facing the two surfaces, by joining the opposite surfaces to each other in an adhesion state. For example, Patent Document 1 discloses a structure in which a frame of a device body is covered with a plurality of covers. The frame includes an open end and a robot connection portion serving as joint surfaces that three-dimensionally intersect with each other while being substantially orthogonal to each other, and the cover includes a first end, a second end, and a lower end. The first end and the second end of the cover are joined to the open end of the frame, and the lower end of the cover is joined to the robot connection portion of the frame.

Patent Document 1: Japanese Unexamined Patent Application, Publication No. 2014-198347

DISCLOSURE OF THE INVENTION

Problems to be Solved by the Invention

According to the above-described joint structure, in a case where two members are fastened to each other such that a joint surface on one side of one member adheres to a joint surface on the one side of the other member, a fastening force on a joint surface on the other side acts along the surface direction, whereby the fastening force is not transmitted. For this reason, it is difficult to enhance an adhesion state between the joint surfaces on the other side and to seal the joint surfaces in a liquid-tight manner. Therefore, there has been a demand for a joint structure capable of causing three-dimensionally intersecting joint surfaces of two members to adhere.

Means for Solving the Problems

One aspect of the present disclosure is directed to a joint structure including: a first member having a first main joint surface, and a first sub joint surface that three-dimensionally intersects with the first main joint surface; a second member having a second main joint surface opposite to the first main joint surface, and a second sub joint surface opposite to the first sub joint surface; a guide configured to gradually shorten a distance between the first sub joint surface and the second sub joint surface that are opposite to each other as a distance between the first main joint surface and the second main joint surface that are opposite to each other decreases, the guide enabling joining of the second sub joint surface to the first sub joint surface upon joining of the second main joint surface to the first main joint surface, the guide being further configured to position the second member relative to the first member; and a fastening member configured to fasten the first main joint surface and the second main joint surface, which have been joined to each other, to each other.

Effects of the Invention

The one aspect of the present disclosure makes it possible to cause three-dimensionally intersecting joint surfaces of two members to adhere.

BRIEF DESCRIPTION OF THE DRAWINGS

FIG. 3 is an exploded perspective view of the second arm part of the articulated robot to which the joint structure according to the first embodiment of the present disclosure is applied, as viewed in another direction;

FIG. 10 is an exploded perspective view of the second arm part of the articulated robot to which the joint structure according to the second embodiment of the present disclosure is applied, as viewed in another direction;

PREFERRED MODE FOR CARRYING OUT THE INVENTION

Embodiments of the present disclosure will be described below with reference to the drawings. Note that "substantial/substantially" as used herein does not strictly specify a state, a size, a direction, an orientation, etc., but rather has the meaning of encompassing an approximate state of a scope capable of achieving the functions and effects of the foregoing.

First Embodiment

Figure 1:
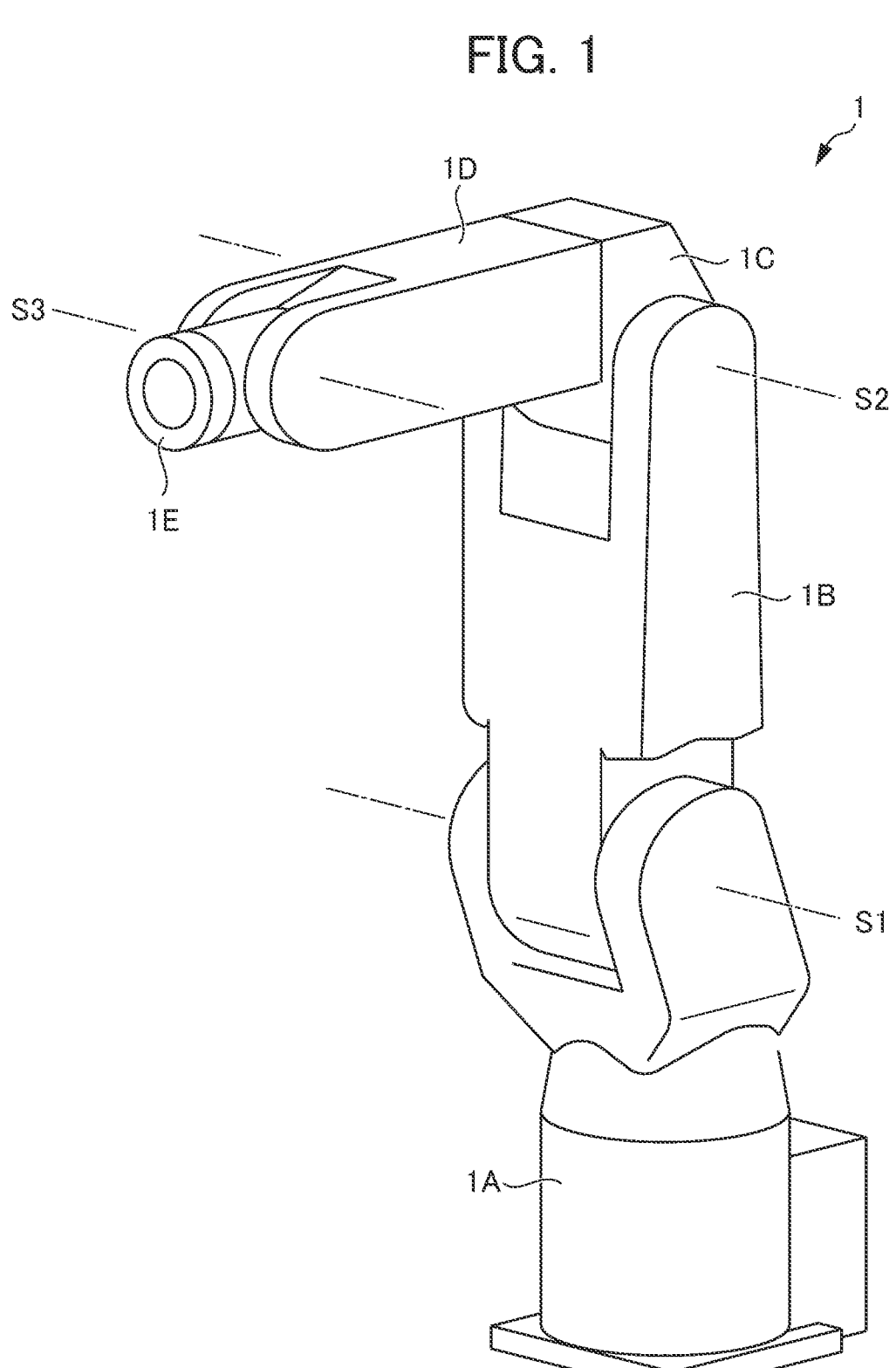
FIG. 1 is a perspective view of an articulated robot to which a joint structure according to a first embodiment of the present disclosure is applied.

FIG. 1 illustrates an external appearance of an articulated robot 1 for industrial use to which a joint structure according to a first embodiment is applied. The articulated robot 1 includes a base 1A, a first arm part 1B pivotably supported by the base 1A, a second arm part 1D pivotably supported at a leading end of the first arm part 1B via a joint part 1C, and a wrist part 1E pivotably supported at a leading end of the second arm part 1D. In FIG. 1, S1 denotes a pivot axis for the first arm part 1B, S2 denotes a pivot axis for the second arm part 1D, and S3 denotes a pivot axis for the wrist part 1E. The joint structure of the first embodiment is applied to the second arm part 1D.

Figure 2:
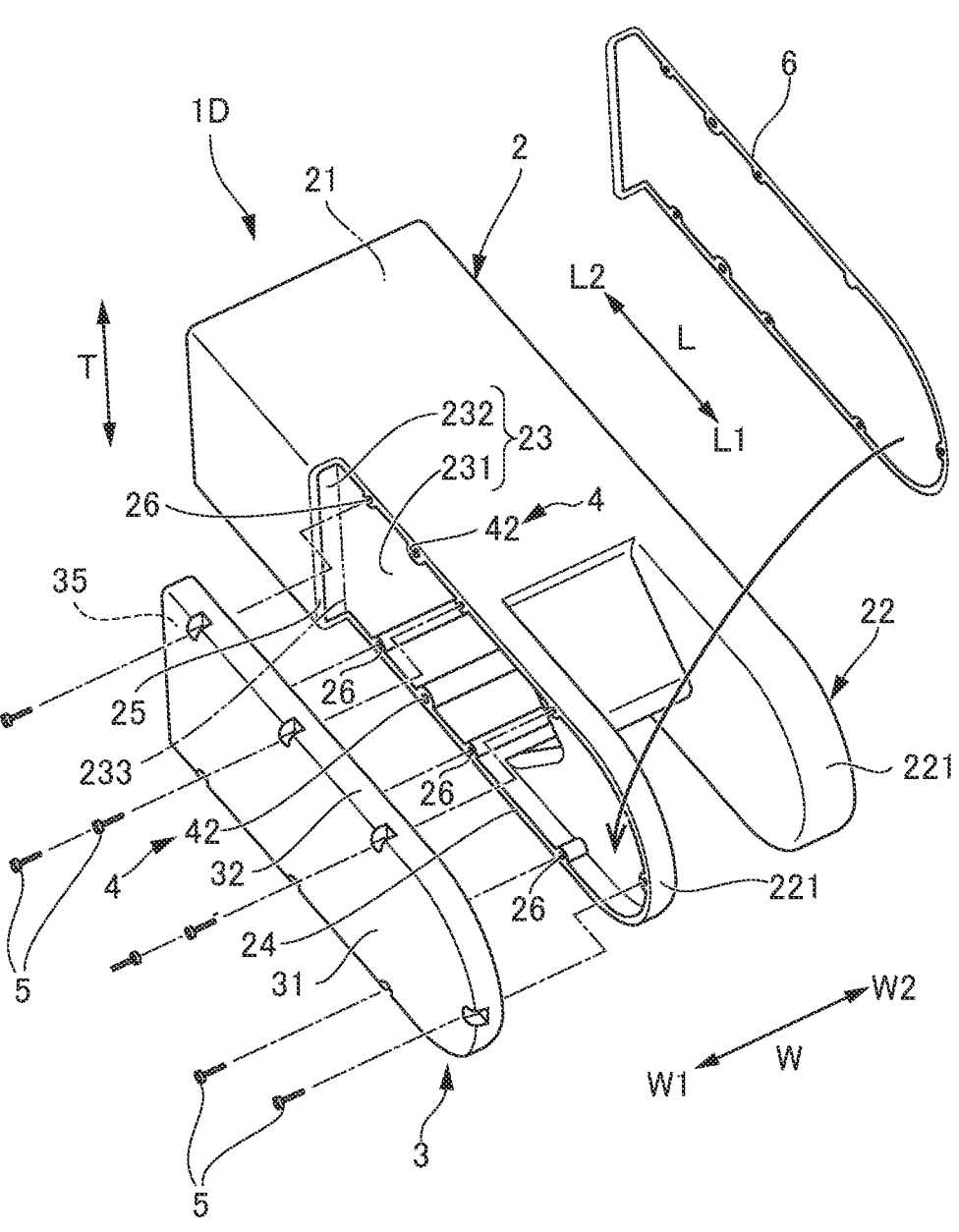
FIG. 2 is an exploded perspective view of a second arm part of the articulated robot to which the joint structure according to the first embodiment of the present disclosure is applied, as viewed in one direction.
Figure 3:
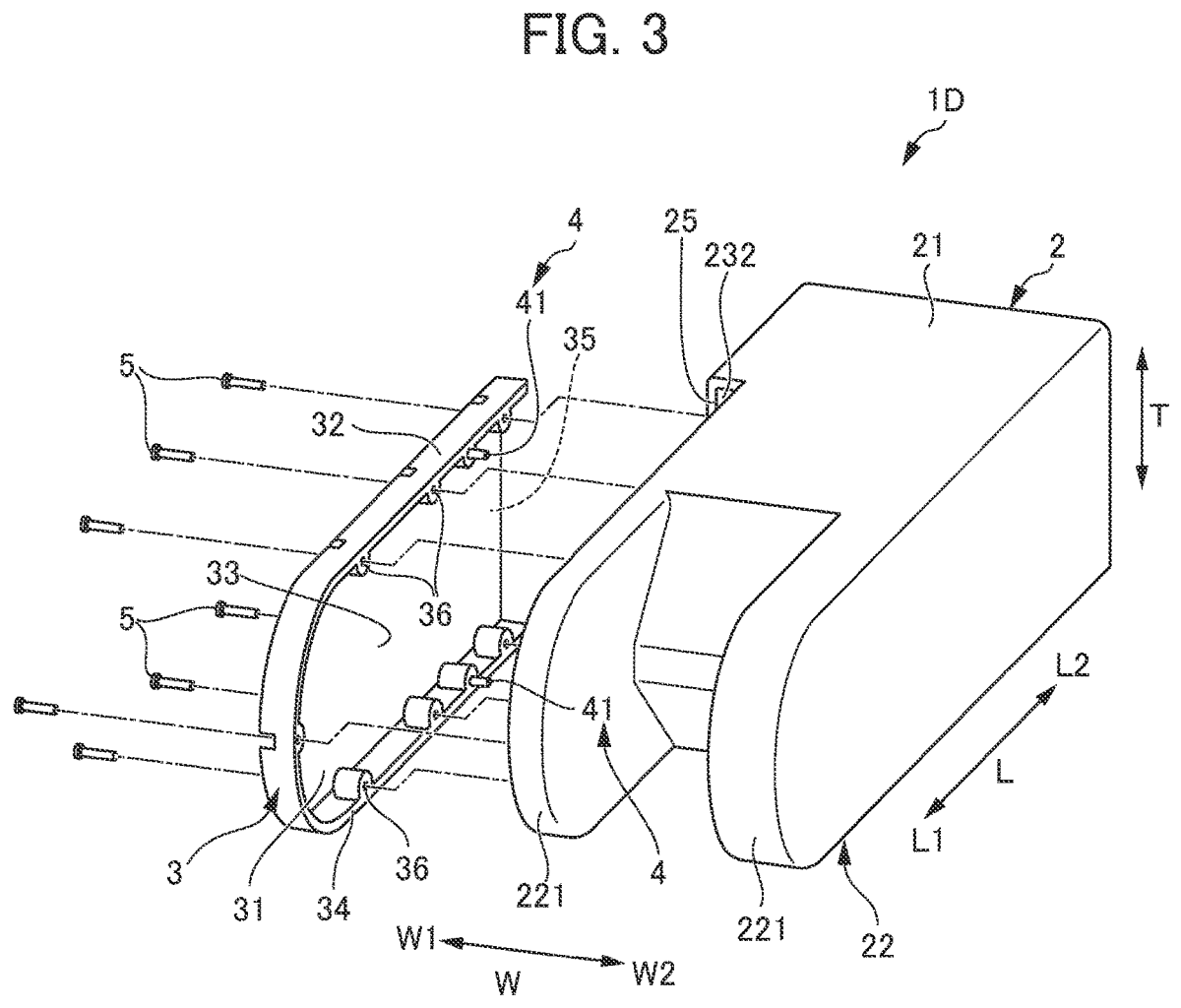

As illustrated in FIGS. 2 and 3, the second arm part 1D includes a casing 2 as a first member, a cover 3 as a second member, a guide 4, and screws 5 as fastening members.

In FIGS. 2 and 3, for the second arm part 1D, a length direction is indicated by an arrow L, a width direction is indicated by an arrow W, and an up/down direction orthogonal to the length direction L and the width direction W is indicated by an arrow T. In particular, in the length direction L, the leading end side of the second arm part 1D is denoted by L1, and the rear end side thereof is denoted by L2. In particular, in the width direction W, the left side where the opening 23 to be described later is located is denoted by W1, and the opposite side thereof is denoted by W2. Note that in the following description, a length direction, a width direction (or a left-right direction), and an up/down direction are based on the length direction L, the width direction W, and the up/down direction T shown in FIGS. 2 and 3, respectively. Likewise, in FIGS. 4 to 15, one of the length direction L, the width direction W, and the up/down direction T is adopted.

The casing 2 forms a major portion of the second arm part 1D. The casing 2 includes a body 21 and a fork portion 22 at the leading end of the body 21. The fork portion 22 includes a pair of protrusions 221 that are parallel to each other. The pair of protrusions 221 are integrated with the body 21, protrude toward the leading end side L1, and are disposed on left-side and right-side portions of the second arm part 1D, respectively. The protrusions 221 each have a leading end in semi-arc shape. The wrist part 1E is disposed between the pair of protrusions 221 and is pivotally supported. A drive mechanism (not shown) and the like for causing the wrist part 1E to pivot is housed in the casing 2.

The casing 2 has the opening 23 on a side portion facing the left side W1. The opening 23 extends from an intermediate portion in the length direction L of the body 21 to one of the protrusions 221. The opening 23 is surrounded by a U-shaped first main joint surface 24 facing a side (the left side W1) and a first sub joint surface 25 facing the leading end side L1. The first main joint surface 24 and the first sub joint surface 25 three-dimensionally intersect with each other while being substantially orthogonal to each other.

The opening 23 includes a main opening 231 demarcated by the first main joint surface 24 and opening toward a side (the left side W1), and a sub opening 232 demarcated by the first sub joint surface 25 and opening toward the leading end side L1. The main opening 231 and the sub opening 232 are continuous with each other. A two-dot chain line 233 in FIG. 2 indicates a boundary between the main opening 231 and the sub opening 232. A plurality of screw holes 26 are formed at predetermined positions on the first main joint surface 24 of the casing 2.

The cover 3 is a member to be fixed to the casing 2 to close the opening 23. The cover 3 includes a flat plate portion 31 having a shape and dimensions for covering the main opening 231, and a frame wall portion 32 having a U-shape. The frame wall portion 32 rises substantially perpendicularly from a U-shaped edge of the flat plate portion 31 extending in the length direction L, toward the casing 2 (i.e., the frame wall portion 32 extends toward the right side W2). The cover 3 has, in its inside (side facing the casing 2), a recess 33 demarcated by the frame wall portion 32. The frame wall portion 32 has a second main joint surface 34 that is opposite to the first main joint surface 24 of the casing 2 (i.e., faces the right side W2) and is to be joined to the first main joint surface 24. Further, the cover 3 has a second sub joint surface 35 that is opposite to the first sub joint surface 25 of the casing 2 (i.e., faces the rear end side L2) and is to be joined to the first sub joint surface 25.

The second main joint surface 34 of the frame wall portion 32 has a plurality of insertion holes 36 formed therein. The plurality of insertion holes 36 are formed at positions corresponding to the plurality of screw holes 26 in the first main joint surface 24 of the casing 2, on a one-to-one basis. The screws 5 inserted through the plurality of insertion holes 36 are screwed into the screw holes 26 corresponding to the insertion holes 36, whereby the cover 3 is fastened to the casing 2. Fastening and fixing the cover 3 to the casing 2 results in closure of the opening 23.

In the present specification, "a hole is formed in a surface" indicates that the hole is formed in a site including the surface so as to extend from the surface. Further, "a projection (and a similar element) is provided on a surface" indicates that the projection projects from a site including the surface.

As illustrated in FIG. 2, a sealing member 6 made of an elastic material such as rubber is interposed between the casing 2 and the cover 3. The sealing member 6 has such a shape and a size that allow the sealing member 6 to be disposed along the first main joint surface 24 and the first sub joint surface 25 of the casing 2. The sealing member 6 is interposed between the first main joint surface 24 and the second main joint surface 34, and between the first sub joint surface 25 and the second sub joint surface 35. The sealing member 6 is strongly sandwiched between the casing 2 and the cover 3 to be collapsed by the fastening force of the screws 5. As a result, the opening 23 is sealed in a liquid-tight manner.

In the above-described state in which the cover 3 closes the opening 23 of the casing 2, the guide 4 has a function of positioning the second main joint surface 34 of the cover 3 to the first main joint surface 24 of the casing 2. Further, the guide 4 has a function of positioning the second sub joint surface 35 of the cover 3 to the first sub joint surface 25 of the casing 2 and causing these surfaces to adhere to each other using a certain degree of pressing force.

Figure 4:
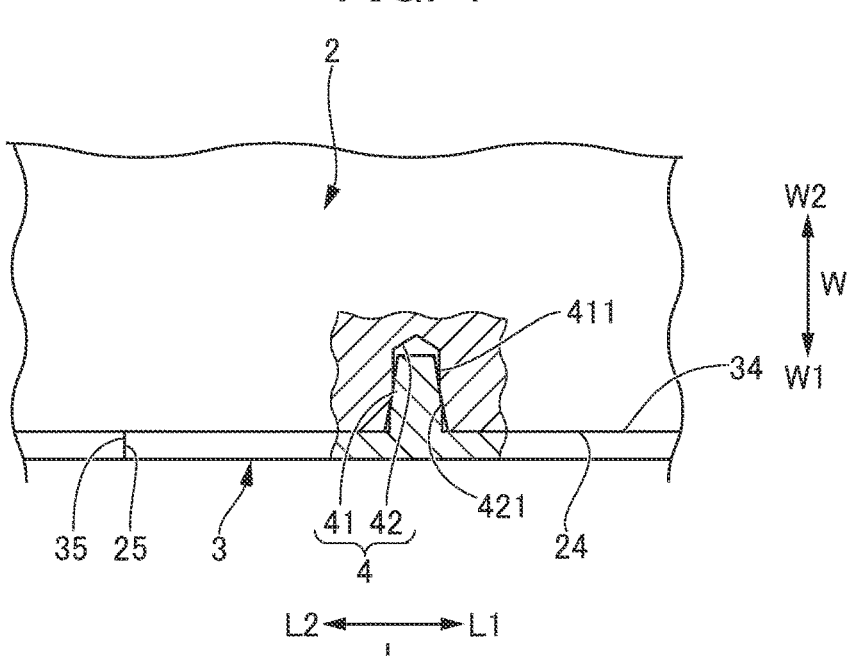
FIG. 4 is a plan view of a guide of the joint structure according to the first embodiment of the present disclosure and illustrates, in a partial cross section, a state in which a casing and a cover of the second arm part are joined to each other.

As illustrated in FIGS. 2 and 3, the guide 4 according to the first embodiment includes a plurality of guide projections 41 provided on the second main joint surface 34 of the cover 3, and guide holes 42 formed in the first main joint surface 24 of the casing 2. As illustrated in FIG. 4, the guide projections 41 project toward the right side W2, and are fitted into the guide holes 42 recessed toward the right side W2. In the present embodiment, as illustrated in FIG. 3, the guide projections 41 are provided, on a one-to-one basis, on an upper portion and a lower portion of the second main joint surface 34 of the cover 3, which extend in the length direction L. As illustrated in FIG. 2, the guide holes 42 are formed at two positions corresponding to the guide projections 41. The number and the positions of the guide projections 41 and those of the guide holes 42 are not limited, but it is preferable to distribute two or more guide projections 41 and two or more guide holes 42, from the viewpoint of increasing the positioning accuracy.

Figure 5:
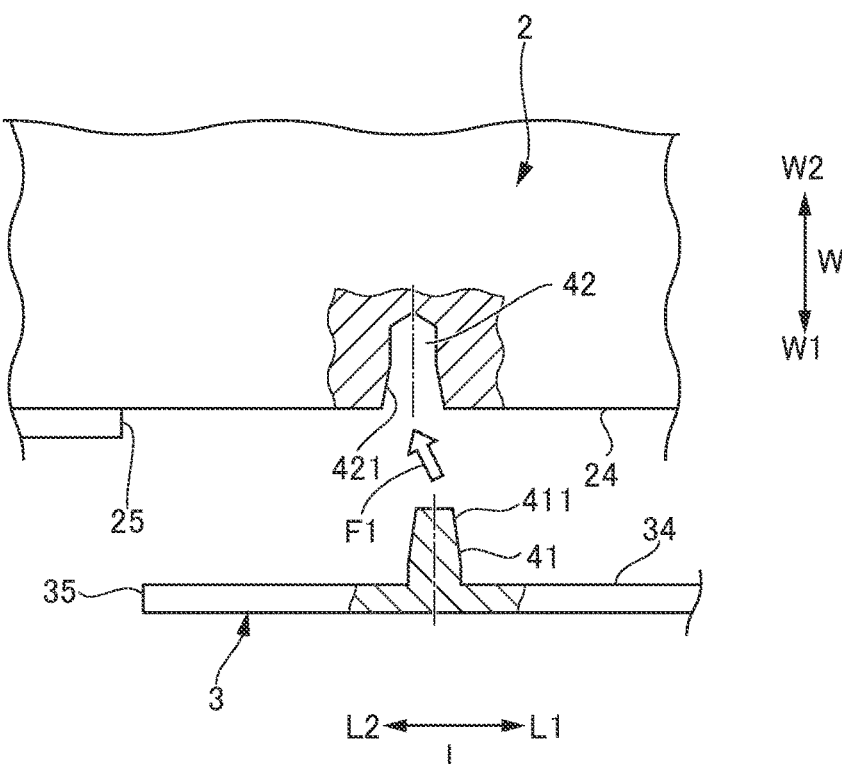
FIG. 5 is a plan view of the guide of the joint structure according to the first embodiment of the present disclosure and illustrates, in a partial cross section, a state in which the casing and the cover of the second arm part are separated from each other.

As illustrated in FIG. 5, the guide hole 42 is a substantially cylindrical hole and has a tapered inner peripheral surface 421 as an inclined guide surface near its opening. The tapered inner peripheral surface 421 defines a conical hole shape that decreases in diameter toward the interior of the guide hole 42. On the other hand, the guide projection 41 has a substantially circular column shape, and has a tapered outer peripheral surface 411 near its leading end. The tapered outer peripheral surface 411 defines a conical shape that decreases in diameter toward the leading end of the guide projection 41. The guide projection 41 is inserted into the guide hole 42 while a portion of the tapered outer peripheral surface 411 slides on a portion of the tapered inner peripheral surface 421, whereby the guide projection 41 is fitted into the guide hole 42.

Due to the guide 4 of the present embodiment, when the cover 3 is brought close to the casing 2 in order to close the opening 23 of the casing 2 with the cover 3 as described above such that the second main joint surface 34 of the cover 3 coincides with the first main joint surface 24 of the casing 2, each of the two guide projections 41 starts to be inserted into the corresponding one of the guide holes 42 of the casing 2.

Here, the guide projections 41 are inserted deeper into guide holes 42 as a distance between the first main joint surface 24 of the casing 2 and the second main joint surface 34 of the cover 3 that are opposite to each other decreases. In this process of the insertion, each guide projection 41 is guided by the tapered inner peripheral surface 421 of the guide hole 42, whereby the cover 3 moves toward the first sub joint surface 25 of the casing 2, and a distance between the first sub joint surface 25 and the second sub joint surface 35 opposite to each other also gradually decreases. The direction in which the cover 3 moves at that time is indicated by the arrow F1 in FIG. 5. As the cover 3 approaches the casing 2, the cover 3 moves toward the first sub joint surface 25 shown in a left portion in FIG. 5 (i.e., toward the rear end side L2 with respect to the casing 2). Thereafter, as illustrated in FIG. 4, when the guide projections 41 have been fitted into the guide holes 42 and the second main joint surface 34 of the cover 3 is joined to the first main joint surface 24 of the casing 2 in an adhesion state, the second sub joint surface 35 of the cover 3 is joined to the first sub joint surface 25 of the casing 2 in an adhesion state.

When each of the plurality of insertion holes 36 of the cover 3 is made to coincide with a corresponding one of the plurality of screw holes 26 of the casing 2, and the screws 5 inserted through the insertion holes 36 are threaded into the screw holes 26, a fastening force is generated with which the second main joint surface 34 of the cover 3 is pressed and fastened to the first main joint surface 24 of the casing 2. The cover 3 is fixed to the casing 2 by this fastening force. On the other hand, the cover 3 moves toward the first sub joint surface 25 of the casing 2 as the guide projections 41 are fitted deeper into the guide holes 42, whereby the fastening force acts to press the second sub joint surface 35 of the cover 3 onto the first sub joint surface 25 of the casing 2 in an adhesion state.

In the present embodiment, the sealing member 6 is interposed between the casing 2 and the cover 3. A portion of the sealing member 6 sandwiched between the first main joint surface 24 of the casing 2 and the second main joint surface 34 of the cover 3 and a portion of the sealing member 6 sandwiched between the first sub joint surface 25 of the casing 2 and the second sub joint surface 35 of the cover 3, i.e., the entirety of the sealing member 6, is strongly sandwiched and collapsed by the fastening force of the screws 5. As a result, the opening 23 is sealed in a liquid-tight manner.

The fastening force of the screws 5 acts in a direction in which the screws 5 are threaded, that is, a direction substantially orthogonal to the first main joint surface 24 of the casing 2. Therefore, normally, no fastening force is generated to cause the first sub joint surface 25, which is substantially orthogonal to the first main joint surface 24 and intersects three-dimensionally with the first main joint surface 24, to adhere to the second sub joint surface 35. However, in the present embodiment, when the cover 3 is brought closer to the casing 2, the cover 3 moves toward the first sub joint surface 25 of the casing 2 due to the action of the guide 4, so that the fastening force of the screws 5 acts to press the second sub joint surface 35 of the cover 3 onto the first sub joint surface 25 of the casing 2. Thus, fixing the cover 3 to the casing 2 with the screws 5 makes it possible not only to join the second main joint surface 34 of the cover 3 to the first main joint surface 24 of the casing 2 in an adhesion state, but also to easily join the second sub joint surface 35 of the cover 3 to the first sub joint surface 25 of the casing 2 in an adhesion state.

It should be noted that guide projections 41 may be provided on the first main joint surface 24 of the casing 2, and guide holes 42 may be formed in the second main joint surface 34 of the cover 3. Alternatively, a guide projection 41 and a guide hole 42 may be provided to the casing 2, and a guide hole 42 and a guide projection 41 corresponding to the foregoing guide projection and hole may be provided to the cover 3.

The first embodiment described above exerts the following effects. The joint structure according to the first embodiment is applied to the second arm part 1D of the articulated robot 1, and includes: the casing 2 having the first main joint surface 24 and the first sub joint surface 25 that three-dimensionally intersects with the first main joint surface 24; the cover 3 having the second main joint surface 34 opposite to the first main joint surface 24, and the second sub joint surface 35 opposite to the first sub joint surface 25; the guide 4 that gradually shortens a distance between the first sub joint surface 25 and the second sub joint surface 35 that are opposite to each other as a distance between the first main joint surface 24 and the second main joint surface 34 that are opposite to each other decreases, enables joining of the second sub joint surface 35 to the first sub joint surface 25 upon joining of the second main joint surface 34 to the first main joint surface 24, and positions the cover 3 relative to the casing 2; and the screws 5 that fasten the first main joint surface 24 and the second main joint surface 34, which have been joined to each other, to each other.

This feature makes it possible to cause the three-dimensionally intersecting joint surfaces of the casing 2, i.e., the first main joint surface 24 and the first sub joint surface 25 of the casing 2 to adhere to the three-dimensionally intersecting joint surfaces of the cover 3, i.e., the second main joint surface 34 and the second sub joint surface 35 of the cover 3, respectively, by using the screws 5 that are threaded in one direction.

According to the first embodiment, the guide 4 includes the guide projections 41 provided on one among the first main joint surface 24 and the second main joint surface 34, and the guide holes 42 formed in the other among the first main joint surface 24 and the second main joint surface 34 and adapted to receive the guide projections 41 fitted therein. The guide holes 42 each have the tapered inner peripheral surface 421 that causes the second member to move toward the first sub joint surface 25 as the guide projection 41 is fitted deeper.

Thus, the guide 4 can be configured with a simple structure.

In the first embodiment, the sealing member 6 is interposed between the first main joint surface 24 of the casing 2 and the second main joint surface 34 of the cover 3 and between the first sub joint surface 25 of the casing 2 and the second sub joint surface 35 of the cover 3.

The sealing member 6 is collapsed by being strongly sandwiched due to the fastening force of the screws 5 in not only its portion sandwiched between the first main joint surface 24 of the casing 2 and the second main joint surface 34 of the cover 3, but also its portion sandwiched between the first sub joint surface 25 of the casing 2 and the second sub joint surface 35 of the cover 3, as described above. As a result, the entire opening 23 is sealed in a liquid-tight manner.

Figures 6, 7:
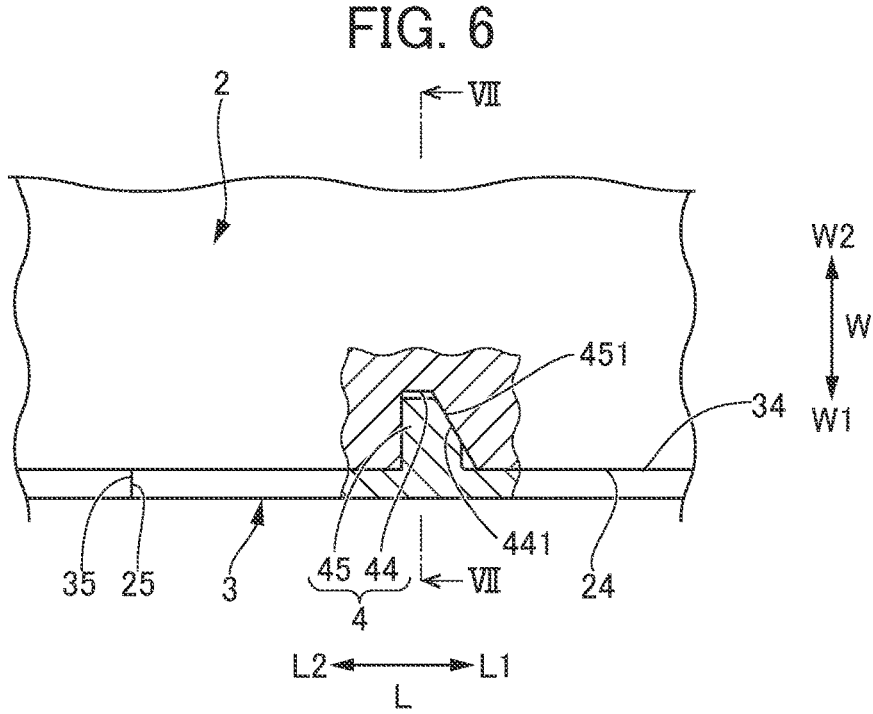
FIG. 6 is a plan view of a modification of the guide of the first embodiment of the present disclosure and illustrates, in a partial cross section, a state in a casing and a cover of the second arm part are joined to each other.
FIG. 7 is a cross-sectional view taken along line VII-VII of FIG. 6.
Figure 8:
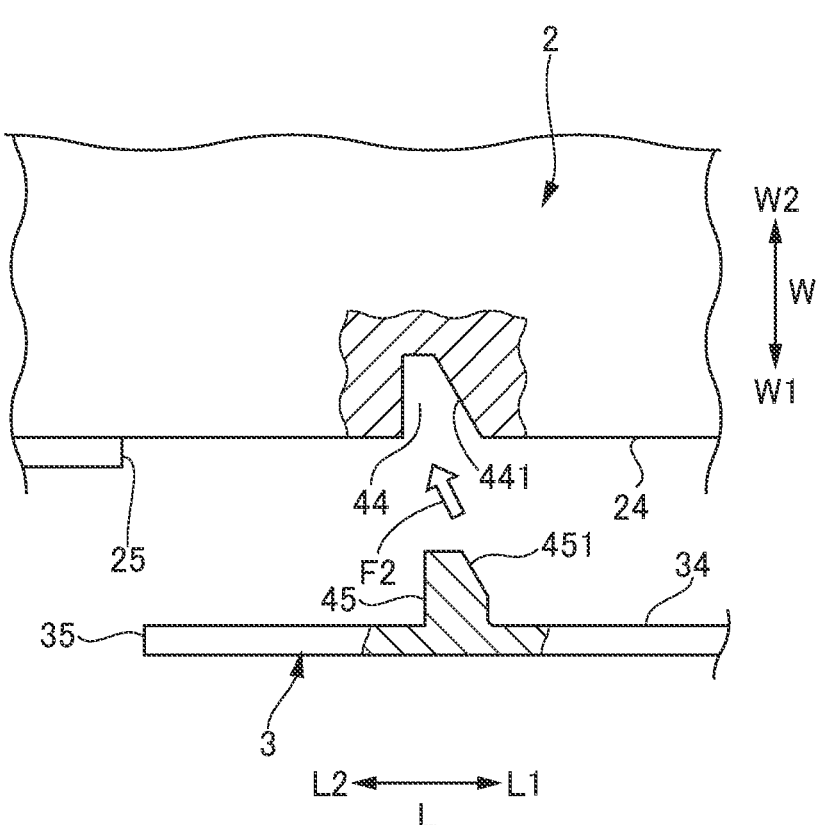
FIG. 8 is a plan view of the modification of the guide of the first embodiment of the present disclosure and illustrates, in a partial cross section, a state in the casing and the cover of the second arm part are separated from each other.

FIGS. 6 to 8 illustrate a modification of the guide projection and the guide hole constituting the guide 4 of the first embodiment. In this modification, the cover 3 has guide protrusions 45 instead of the guide projections 41 of the first embodiment, and the casing 2 has guide holes 44 instead of the guide holes 42 of the first embodiment.

FIGS. 6 and 7 illustrate a state in which the guide protrusion 45 has been fitted into the guide hole 44. As illustrated in FIG. 8, the guide hole 44 of the casing 2 has a rectangular cross-sectional shape, and an inner wall thereof is provided with an inclined guide surface 441 adjacent to the leading end side L1 of the second arm part 1D. While extending in the up/down direction T of the second arm part 1D, the inclined guide surface 441 is directed toward the rear end side L2, i.e., toward the first sub joint surface 25 as approaching the interior of the guide hole 44, and is inclined with respect to the first main joint surface 24.

As illustrated in FIG. 8, the guide projection 45 of the cover 3 has an inclined surface 451 adjacent to the leading end side L1 of the second arm part 1D. The inclined surface 451 is inclined in such a manner as to slide on the inclined guide surface 441 when the guide projection 45 is inserted into the guide hole 44.

According to this modification, in the process of inserting and fitting the guide projection 45 into the guide hole 44, the inclined surface 451 of the guide projection 45 slides on the inclined guide surface 441 of the guide hole 44, whereby the cover 3 gradually moves toward the first sub joint surface 25 of the casing 2, and the distance between the first sub joint surface 25 and the second sub joint surface 35 opposite to each other also gradually decreases. The arrow F2 in FIG. 8 indicates the direction in which the cover 3 moves at this time. Thereafter, as illustrated in FIG. 6, when the guide projection 45 has been fitted in the guide hole 44 and the second main joint surface 34 of the cover 3 is joined to the first main joint surface 24 of the casing 2 in an adhesion state, the second sub joint surface 35 of the cover 3 is joined to the first sub joint surface 25 of the casing 2 in an adhesion state.

Thus, this modification also makes it possible to cause the first main joint surface 24 and the first sub joint surface 25 of the casing 2 to adhere to the second main joint surface 34 and the second sub joint surface 35 of the cover 3, respectively, by using the screws 5 that are threaded in one direction.

Next, a second embodiment and a third embodiment will be described. The second embodiment and the third embodiment have many components similar to those of the first embodiment described above. Accordingly, when referring to the drawings, components similar to those of the first embodiment are denoted by the same reference signs, and descriptions thereof will be omitted or simplified, and only differences will be mainly described.

Second Embodiment

The second embodiment will be described with reference to FIGS. 9 to 12. The second embodiment differs from the first embodiment in the configuration of the guide 4.

Figure 9:
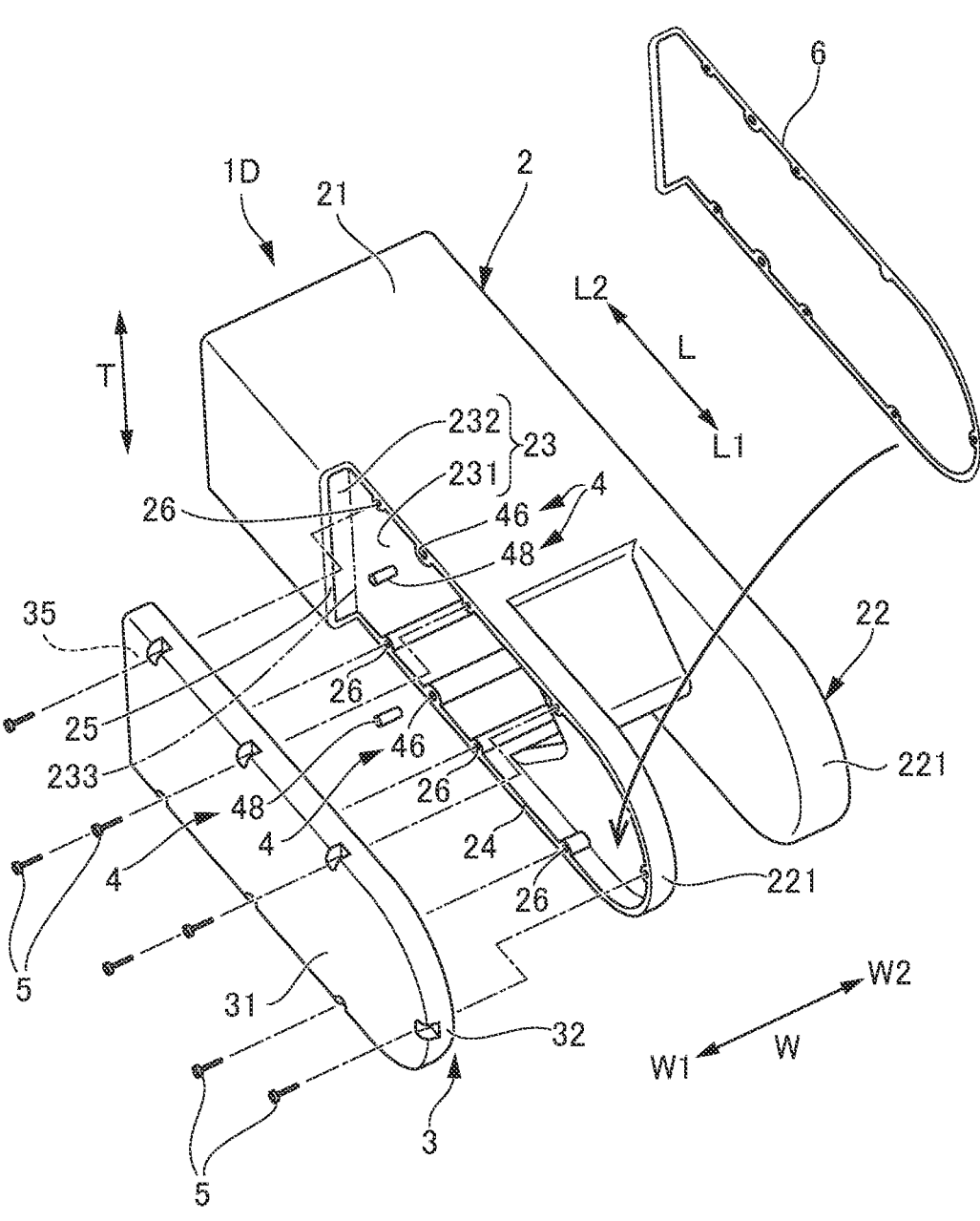
FIG. 9 is an exploded perspective view of a second arm part of an articulated robot to which a joint structure according to a second embodiment of the present disclosure is applied, as viewed in one direction.
Figure 10:
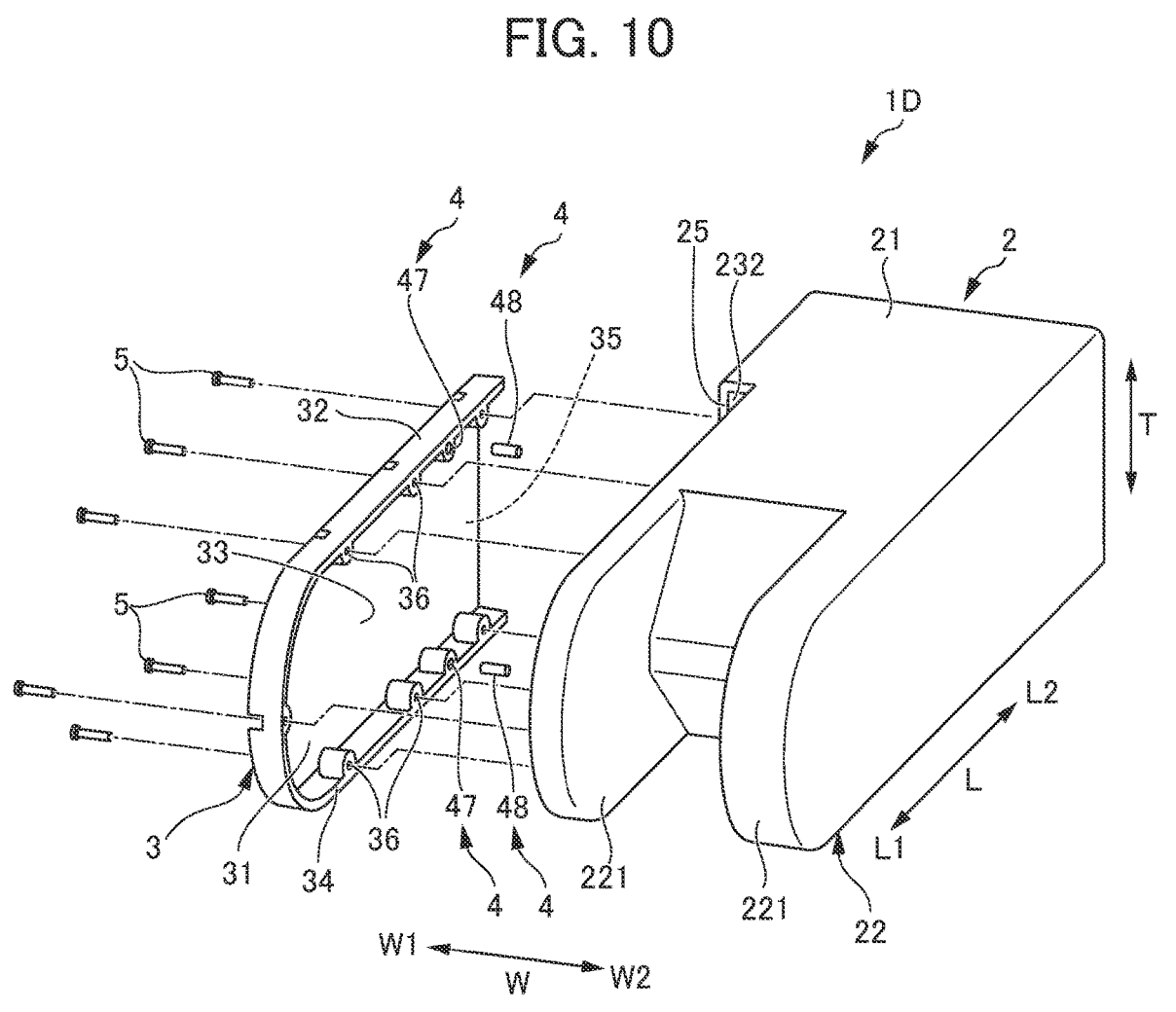

As illustrated in FIGS. 9 and 10, the guide 4 according to the second embodiment includes a plurality of first guide holes 46 formed in a first main joint surface 24 of a casing 2, a plurality of second guide holes 47 formed in a second main joint surface 34 of a cover 3 and corresponding to the respective first guide holes 46, and guide pieces 48, each of which is to be fitted to one of the first guide holes 46 and one of the second guide holes 47 that correspond to each other. In the present embodiment, the first guide holes 46 are formed, on a one-to-one basis, in an upper portion and a lower portion of the first main joint surface 24, which extend in the length direction L. Correspondingly, the second guide holes 47 are formed, on a one-to-one basis, in an upper portion and a lower portion of the second main joint surface 34, which extend in the length direction L. The number and the positions of the first guide holes 46 and those of the second guide holes 47 are not limited, but it is preferable to distribute two or more first guide holes 46 and two or more second guide holes 47, from the viewpoint of increasing the positioning accuracy.

Figure 11:
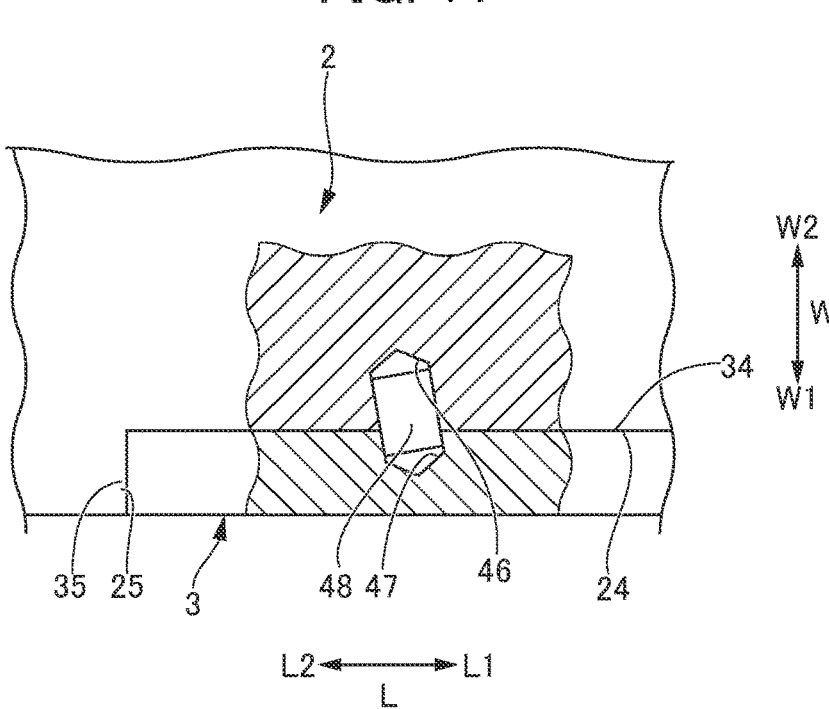
FIG. 11 is a plan view of a guide of the joint structure according to the second embodiment of the present disclosure and illustrates, in a partial cross section, a state in which a casing and a cover of the second arm part are joined to each other.
Figure 12:
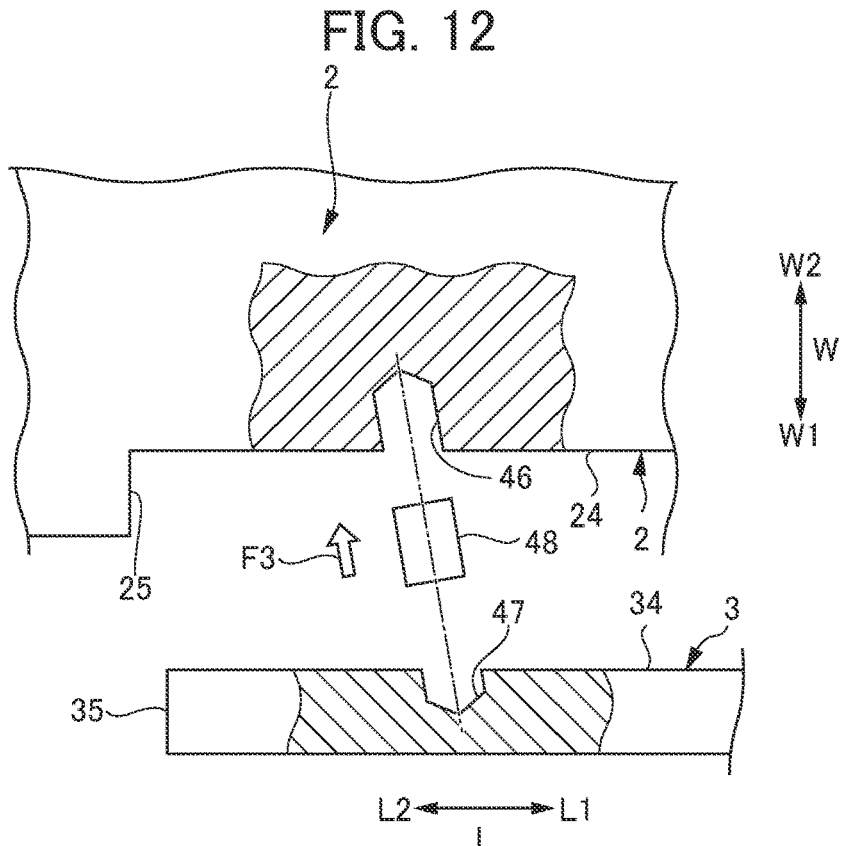
FIG. 12 is a plan view of the guide of the joint structure according to the second embodiment of the present disclosure and illustrates, in a partial cross section, a state in which the casing and the cover of the second arm part are separated from each other.

FIG. 11 illustrates a state in which the guide piece 48 has been fitted into both the first guide hole 46 and the second guide hole 47. The first guide hole 46 and the second guide hole 47 are each a substantially cylindrical hole and have substantially the same inner diameter. The first guide hole 46 is recessed toward the right side W2. The second guide hole 47 is recessed toward the left side W1.

The axial direction of each first guide hole 46 is along a plane defined by the length direction L and the width direction W of the second arm part 1D, while extending obliquely toward the rear end side L2, i.e., toward the first sub joint surface 25, toward the interior. The second guide hole 47 is formed such that the axis thereof becomes parallel to the axis of the first guide hole 46 in a state in which the cover 3 is fixed to the casing 2.

The guide 4 of the second embodiment causes the guide pieces 48 to be fitted into the first guide holes 46 or the second guide holes 47, and thereafter, causes the cover 3 to approach the casing 2 so that the cover 3 closes the opening 23. For example, the guide 4 causes the guide pieces 48 to be fitted into the first guide holes 46 of the casing 2, and thereafter, causes the cover 3 to approach the casing 2 such that the guide pieces 48 are fitted into the second guide holes 47 of the cover 3.

At an initial stage where the guide pieces 48 have been inserted into both the second guide holes 47, there is a gap between the second sub joint surface 35 of the cover 3 and the first sub joint surface 25 of the casing 2 that are opposite to each other. In the subsequent course of fitting the guide pieces 48 into the second guide holes 47, the second main joint surface 34 of the cover 3 approaches the first main joint surface 24 of the casing 2, and the cover 3 is guided by the guide pieces 48 so as to gradually move toward the first sub joint surface 25 of the casing 2, whereby the distance between the first sub joint surface 25 and the second sub joint surface 35 that are opposite to each other gradually decreases. The arrow F3 in FIG. 12 indicates the direction in which the cover 3 moves at this time. As illustrated in FIG. 11, when the second main joint surface 34 of the cover 3 is joined to the first main joint surface 24 of the casing 2 in an adhesion state, the second sub joint surface 35 of the cover 3 is joined to the first sub joint surface 25 of the casing 2 in an adhesion state.

The guide 4 of the second embodiment includes the first guide holes 46 formed in the first main joint surface 24 of the casing 2, second guide holes 47 formed in the second main joint surface 34 of the cover 3, and guide pieces 48 to be fitted to both the first guide holes 46 and the second guide holes 47. Each of the first guide holes 46 and the second guide holes 47 extends in a direction in which the cover 3 is allowed to move toward the first sub joint surface 25 of the casing 2 as the guide pieces 48 are fitted deeper.

This feature makes it possible to cause the first main joint surface 24 and the first sub joint surface 25 of the casing 2 to adhere to the second main joint surface 34 and the second sub joint surface 35 of the cover 3, respectively, by using the screws 5 that are threaded in one direction.

Third Embodiment

The third embodiment will be described with reference to FIGS. 13 to 15. The third embodiment differs from the first embodiment in the configuration of the second arm part 1D.

Figure 13:
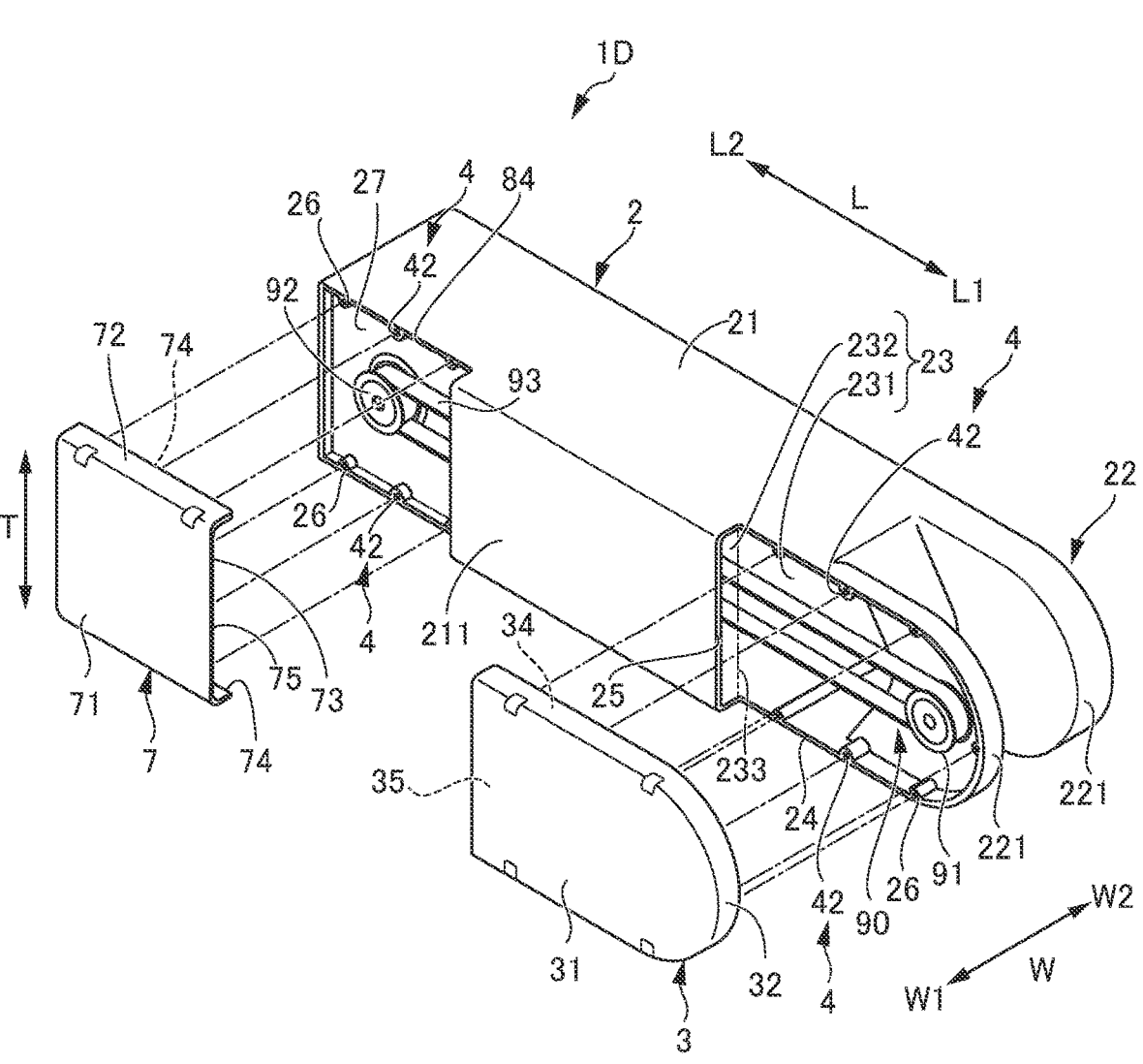
FIG. 13 is an exploded perspective view of a second arm part of an articulated robot according to a third embodiment of the present disclosure, as viewed in one direction.
Figure 14:
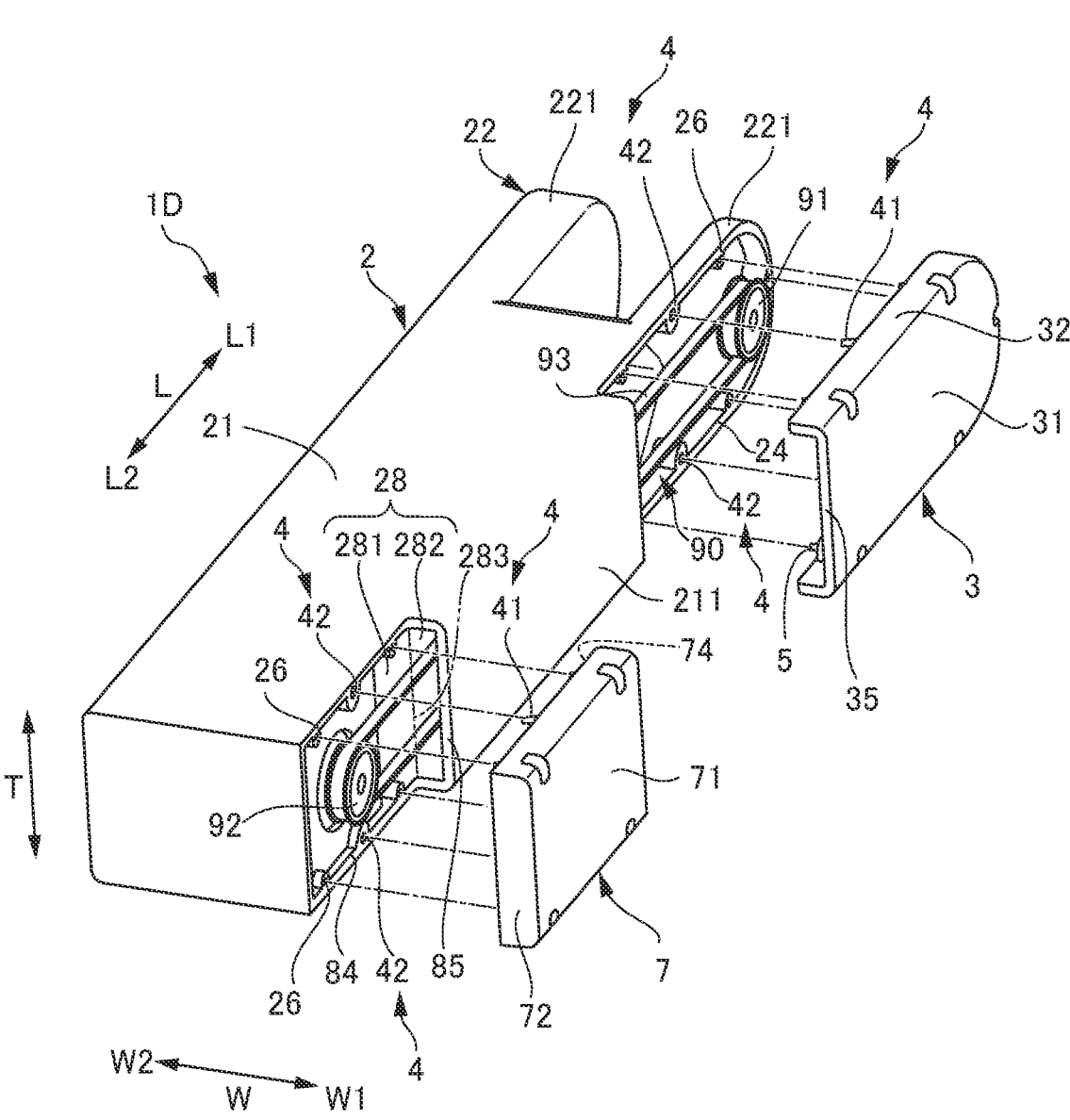
FIG. 14 is an exploded perspective view of the second arm part of the articulated robot according to the third embodiment of the present disclosure, as viewed in another direction.
Figure 15:
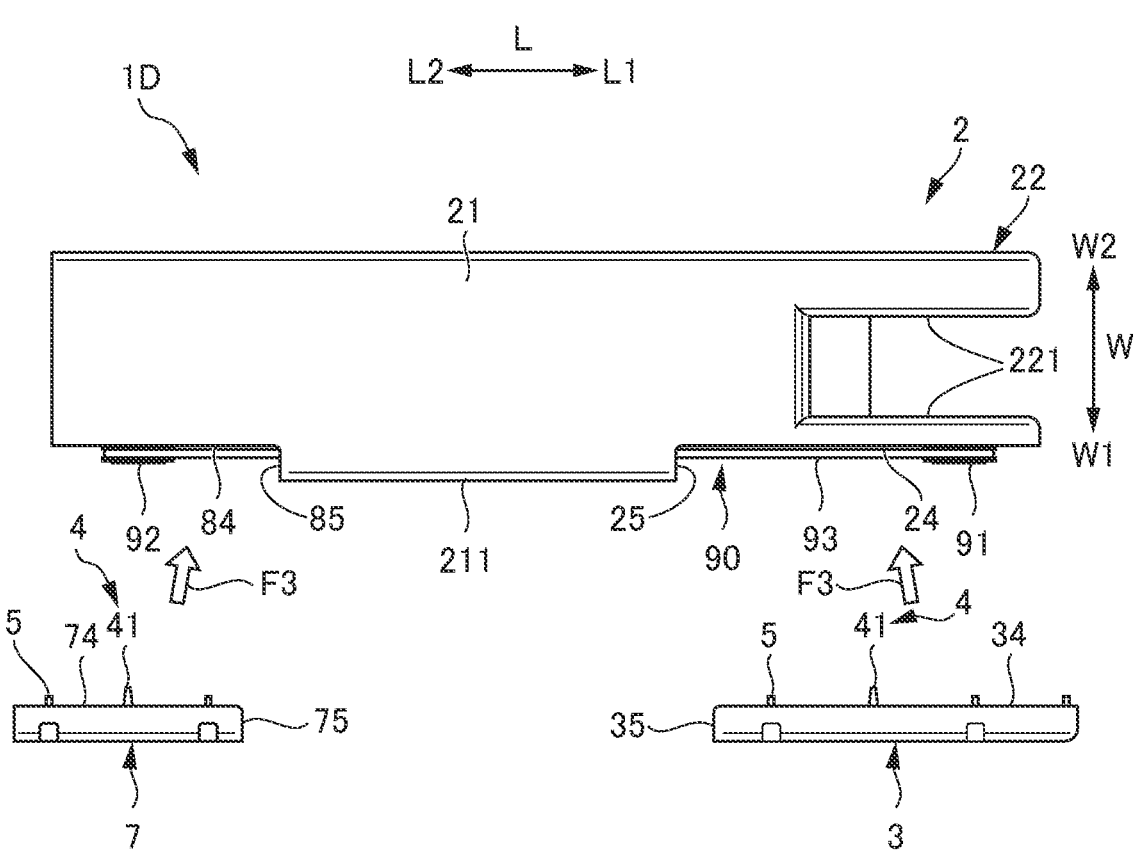
FIG. 15 is a plan view of the second arm part of the articulated robot according to the third embodiment of the present disclosure and illustrates a state in which a casing, a front cover, and a rear cover of the second arm part are separated from each other.

As illustrated in FIGS. 13 and 14, the second arm part 1D according to the third embodiment has, in a portion adjacent to the leading end side L1, the same configuration as that of the first embodiment; specifically, it includes a fork portion 22 that supports a wrist part 1E, an opening 23, and a cover 3 that closes the opening 23. Furthermore, similarly to the first embodiment, a guide 4 is provided which includes a plurality of (two in this case) guide holes 42 formed in a first main joint surface 24 of the casing 2, and guide projections 41 corresponding to the guide holes 42 formed on a second main joint surface 34 of the cover 3. The opening 23 and the cover 3 of the third embodiment are shorter in length than those of the first embodiment.

The second arm part 1D according to the third embodiment further has, in its portion adjacent to the rear end side L2, an opening 27 that opens toward a side (left side W1) and a cover 7 that closes the opening 27. Hereinafter, the opening 23 and the cover 3 adjacent to the leading end side L1 are referred to as the front opening 23 and the front cover 3, respectively, while the opening 27 and the cover 7 adjacent to the rear end side L2 are referred to as the rear opening 27 and the rear cover 7, respectively.

The rear opening 27 and the front opening 23 open toward the same side (left side W1). The rear opening 27 is surrounded by a first main joint surface 84 that is composed of a pair of upper and lower portions extending in the length direction L and a rear end portion extending in the up/down direction T, and by a first sub joint surface 85 facing the rear end side L2. The first main joint surface 84 and the first sub joint surface 85 three-dimensionally intersect with each other while being substantially orthogonal to each other. The first main joint surface 84 has a plurality of screw holes 26 formed therein. Similarly to the front cover 3, the rear cover 7 is fixed to the casing 2 by screws 5 threaded into the screw holes 26.

The rear opening 27 includes a main opening 281 demarcated by the first main joint surface 84 and opening toward a side (left side W1), and a sub opening 282 demarcated by the first sub joint surface 85 and opening toward the rear end side L2. The main opening 281 and the sub opening 282 are continuous with each other. The two-dot chain line 283 in FIG. 14 indicates a boundary between the main opening 281 and the sub opening 282. The plurality of screw holes 26 are formed at predetermined positions on the first main joint surface 84.

The rear cover 7 that closes the rear opening 27 includes a flat plate portion 71 having a shape and dimensions for covering the main opening 281, and a frame wall portion 72 that rises substantially perpendicularly from edges of the flat plate portion 71 extending in the length direction L and a rear edge of the flat plate portion 71, toward the casing 2 (i.e., the frame wall portion 72 extends toward the right side W2). The rear cover 7 has, in its inside (side facing the casing 2), a recess 73 demarcated by the frame wall portion 72. The frame wall portion 72 has a second main joint surface 74 that is opposite to the first main joint surface 84 of the casing 2 (i.e., faces the right side W2) and is to be joined to the first main joint surface 84. Further, the rear cover 7 has a second sub joint surface 75 that is opposite to the first sub joint surface 85 of the casing 2 (i.e., faces the leading end side L1) and is to be joined to the first sub joint surface 85.

A body 21 of the casing 2 has, between the rear opening 27 and the front opening 23, an intermediate wall portion 211 protruding toward a side (left side W1) from the first main joint surfaces 24 and 84. The inside of the intermediate wall portion 211 communicates with the inside of the body 21. The intermediate wall portion 211 defines, in its inside, a space that opens to the sub openings 232 and 282, and communicates with the recess 33 of the front cover 3 and the recess 73 of the rear cover 7 in a state where the covers 3 and 7 are fixed to the casing 2.

The casing 2 houses a driving unit 90 that causes the wrist part 1E illustrated in FIG. 1 to pivot. The driving unit 90 includes a driven pulley 91 adjacent to the leading end side L1, a drive pulley 92 adjacent to the rear end side L2, and a transmission belt 93 wrapped around the driven pulley 91 and the drive pulley 92 to transmit rotation of the drive pulley 92 to the driven pulley 91. The transmission belt 93 extends in the length direction L. The driven pulley 91 is coupled to a rotary shaft of the wrist part 1E. The wrist part 1E pivots in accordance with the rotation of the driven pulley 91. The driving unit 90, in which the drive pulley 92 is rotationally driven by a motor (not shown), and the transmission belt 93 transmits the rotation of the drive pulley 92 to the driven pulley 91, causes the wrist part 1E to pivot.

The driving unit 90 is disposed in the casing 2 in proximity to the front opening 23 and the rear opening 27. The transmission belt 93 is disposed inside the intermediate wall portion 211 and passes through the sub openings 232 and 282, which are adjacent to the leading end side and the rear end side, respectively.

At least a portion of the driving unit 90 is disposed outward (toward the left side W1) relative to the first main joint surface 24 and the first main joint surface 84 of the casing 2. More specifically, at least a portion of the driven pulley 91 is disposed outward (toward the left side W1) relative to the first main joint surface 24 and the first main joint surface 84. At least a portion of the drive pulley 92 is disposed outward (toward the left side W1) relative to the first main joint surface 24 and the first main joint surface 84. Further, in correspondence with the driven pulley 91 and the drive pulley 92, at least a portion of the transmission belt 93 is disposed outward (toward the left side W1) relative to the first main joint surface 24 and the first main joint surface 84.

Disposing at least a portion of the driving unit 90 outward (toward the left side W1) relative to first main joint surface 24 and the first main joint surface 84 in this manner provides advantages in that a margin is produced in the housing space in the casing 2, a degree of freedom of arrangement of other devices or the like is improved in a case where such other devices or the like are to be housed, and maintenance of the driving unit 90 and the other housed devices is facilitated.

The rear cover 7 is positioned and joined to the casing 2 by a guide 4 similar to that of the first embodiment, and closes the rear opening 27. In a state where the rear cover 7 closes the rear opening 27, the guide 4 of the third embodiment has a function of positioning the second main joint surface 74 of the rear cover 7 to the first main joint surface 84 of the casing 2. Furthermore, the guide 4 of the third embodiment has a function of positioning the second sub joint surface 75 of the rear cover 7 to the first sub joint surface 85 of the casing 2 and causing these surfaces to adhere to each other using a certain degree of pressing force.

The guide 4 according to the third embodiment includes the plurality of guide projections 41 provided on the second main joint surface 74 of the rear cover 7, and the plurality of guide holes 42 formed in the first main joint surface 84 of the casing 2. The guide projections 41 are fitted into the guide holes 42. The guide holes 42 are formed, on a one-to-one basis, in an upper portion and a lower portion of the first main joint surface 84, which extend in the length direction L. The guide projections 41 are disposed at two positions corresponding to the guide holes 42.

Due to the guide 4 of the third embodiment, when the rear cover 7 is brought close to the casing 2 in order to close the rear opening 27 with the rear cover 7 so that the second main joint surface 74 of the rear cover 7 coincides with the first main joint surface 84 of the casing 2, each of the two guide projections 41 starts to be inserted into the corresponding one of the guide holes 42 of the casing 2.

Here, the guide projections 41 are inserted deeper into the guide holes 42 as a distance between the first main joint surface 84 of the casing 2 and the second main joint surface 74 of the rear cover 7 that are opposite to each other decreases, as in the first embodiment. In the course thereof, the rear cover 7 moves toward the leading end side L1, i.e., toward the first sub joint surface 85, and a distance between the first sub joint surface 85 and the second sub joint surface 75 opposite to each other also gradually decreases. The direction in which the rear cover 7 moves at this time is indicated by the arrow F4 in FIG. 15. As the rear cover 7 approaches the casing 2, the rear cover 7 moves toward the first sub joint surface 85 shown in a right portion in FIG. 15. Thereafter, when the guide projections 41 have been fitted into the guide holes 42 and the second main joint surface 74 of the rear cover 7 is joined to the first main joint surface 84 of the casing 2 in an adhesion state, the second sub joint surface 75 of the rear cover 7 is joined to the first sub joint surface 85 of the casing 2 in an adhesion state.

Although not shown in the drawings, the third embodiment includes an aspect in which a sealing member made of an elastic material such as rubber is interposed between the casing 2 and the rear cover 7 to seal the casing 2 and the rear cover 7 in a liquid-tight manner. Specifically, the sealing member has such a shape and a size that allows the sealing member to be disposed along the first main joint surface 84 and the first sub joint surface 85, and is interposed between the first main joint surface 84 and the second main joint surface 74 and between the first sub joint surface 85 and the second sub joint surface 75.

According to the third embodiment, the intermediate wall portion 211 has a thickness that is not entirely solid, and defines the space that communicates with the sub openings 232 and 282 that are adjacent to the leading and rear end sides, respectively. This feature suppresses an increase in weight. Furthermore, this feature increases the housing space in the casing 2 and improves a degree of freedom of arrangement of the driving unit 90.

The present disclosure is not limited to the above-described embodiments, and can be appropriately modified. The guide of the present disclosure may have any configuration, provided that the guide gradually shortens a distance between the first sub joint surface 25 of the casing 2 and the second sub joint surface 35 of the cover 3 as a distance between the first main joint surface 24 of the casing 2 and the second main joint surface 34 of the cover 3 decreases, and is capable of positioning at the time of joining. Although the screws are used as the fastening members, other fastening members such as rivets may be used instead of the screws. The casing 2 and the cover 3 constituting the arm part of the articulated robot are disclosed as the first member and the second member. However, the joint structure of the present disclosure is not limited to such a structure for joining the first member to the second member, and is applicable to any joint structure for joining two three-dimensionally intersecting joint surfaces to other two three-dimensionally intersecting joint surfaces.

EXPLANATION OF REFERENCE NUMERALS

2: Casing (First member)
3: Cover (Second member)
4: Guide
5: Screw (Fastening member)
6: Sealing member
24, 84: First main joint surface
25, 85: First sub joint surface
34, 74: Second main joint surface
35, 75: Second sub joint surface
41: Guide projection
42: Guide hole
46: First guide hole
47: Second guide hole
48: Guide piece
421: Tapered inner peripheral surface (Inclined guide surface)
441: Inclined guide surface

The invention claimed is:
1. A joint structure comprising:
an articulated robot arm having an opening having a first peripheral wall comprising a first main joint surface, and a shoulder surface traversing the opening comprising a first sub joint surface that three-dimensionally intersects with the first main joint surface;

a cover for the robot arm, the cover having a second peripheral wall corresponding to the first peripheral wall, the second peripheral wall comprising a second main joint surface opposite to the first main joint surface, and an edge surface comprising a second sub joint surface opposite to the first sub joint surface;

a guide configured to gradually shorten a distance between the first sub joint surface and the second sub joint surface that are opposite to each other as a distance between the first main joint surface and the second main joint surface that are opposite to each other decreases, the guide enabling joining of the second sub joint surface to the first sub joint surface in a state of surface contact, upon joining of the second main joint surface to the first main joint surface in a state of surface contact, the guide being further configured to position the cover relative to the robot arm; and a fastening member configured to fasten the first main joint surface and the second main joint surface, which have been joined to each other, to each other, wherein the guide causes the cover to move at least in a direction parallel to the first main joint surface;

wherein the guide comprises a guide projection provided on one of the first main joint surface and the second main joint surface, and a guide hole formed in the other of the first main joint surface and the second main joint surface, and adapted to receive the guide projection fitted therein; and wherein the guide hole and guide projection each have an inclined guide surface angled toward a respective one of the first and second sub joint surfaces that causes the cover to move toward the first sub joint surface as the guide projection is inserted deeper into the guide hole.

2. The joint structure according to claim 1, wherein the guide comprises:

a first guide hole formed in the first main joint surface; and a second guide hole formed in the second main joint surface;

wherein the guide projection is adapted to be fitted in both the first guide hole and the second guide hole, and wherein the first guide hole and the second guide hole each extend in a direction that allows the cover to move toward the first sub joint surface as the guide projection is inserted deeper into the guide holes.

3. The joint structure according to claim 1, wherein a sealing member is interposed between the first main joint surface and the second main joint surface and between the first sub joint surface and the second sub joint surface.

4. The joint structure according to claim 1, wherein the guide projection is integrally formed with the cover or the robot arm.

* * * * *